Nov. 8, 1938.  S. H. BERCH  2,135,479
METHOD AND MEANS OF PACKING FOODS
Filed July 14, 1937
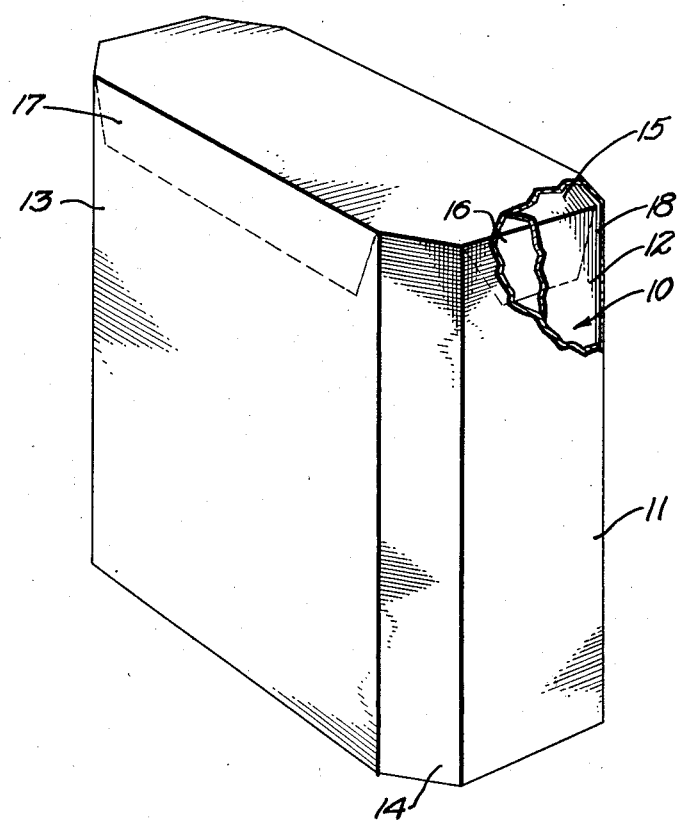
INVENTOR
SAMUEL H BERCH
BY James M. Abbett
ATTORNEY Patented Nov. 8, 1938

2,135,479

UNITED STATES PATENT OFFICE 2,135,479

METHOD AND MEANS OF PACKING FOODS

Samuel H. Berch, Beverly Hills, Calif.

Application July 14, 1937, Serial No. 153,646

11 Claims. (Cl. 99—152)

This invention relates to the preparation and packaging of food products for the market, and particularly pertains to a method and means of packing foods.

In dispensing various food products to the public, and particularly in connection with the preparation and packaging of coffee, it is essential that the product be maintained in a fresh condition. Heretofore a common method of packing coffee after it has been roasted and ground is to place it in metal containers and to subject the containers and the product to a high degree of vacuum as the container is being sealed. It has been the theory that such a vacuum action extracted the air from the container and maintained the coffee in a fresh condition. The present invention is based on a contrary theory to the effect that so-called vacuum packing is not only detrimental to the freshness of the product, but that in addition the product will lose its freshness and turn stale more rapidly after the vacuum sealed container has been opened than would have been the case if vacuum sealing had not been employed. Research has proven that freshness of coffee and its aroma are indicative of the same desirable characteristics of coffee and that as the coffee liberates its occluded carbon dioxide gases it loses its aroma and freshness, and that furthermore when it absorbs air oxidations of the fats and oil in the coffee take place to make it rancid. It is also known that roasted and ground coffee liberates a quantity of carbon dioxide gas amounting to many times the volume of the coffee from which it is liberated, and that in view of the fact that this gas establishes and maintains the qualities known as coffee freshness and aroma it is desirable to keep the gas in intimate association with the coffee and in an occluded condition within its particles. It will be evident that when a high degree of vacuum is imposed upon the coffee when it is sealed that not only will all of the then present carbon dioxide gas be withdrawn from the container, but a negative pressure will be created within the container which tends constantly to extract the carbon dioxide gases from the coffee particles so that when the container is unsealed instant permanent separation of the carbon dioxide gas and the coffee will take place whereby the aroma and freshness will be quickly lost. At the same time the coffee particles from which the occluded carbon dioxide gas has been extracted will take in the oxygen of the air, and since oxidation of the coffee fats will begin immediately there will simultaneously occur a loss in strength and freshness of the coffee and increase in rancidity. It is the principal object of the present invention to provide a new method and means of packing coffee employing a simple and inexpensive non-metallic container within which the coffee is sealed impervious to air and moisture, and with a maximum quantity of native occluded carbon dioxide gas remaining in the coffee, with the emanating gas being accommodated within the hermetically sealed container until the seal of the container is broken.

The present invention therefor contemplates that the method will be practiced by the use of a relatively rigid inner container which is not hermetically sealed, and within which a desired quantity of coffee may be packed while allowing clearance space for subsequently developing gases, the said inner container being sealed within an outer impervious envelope which is subjected to a relatively low vacuum action effective to withdraw the air from the outer envelope to collapse it against the rigid inner container without establishing a high degree of negative pressure within the package, and while accommodating the emanation of carbon dioxide gas from the coffee under its natural pressure and not under the influence of negative pressure.

The invention is illustrated by way of example in the accompanying drawing in which the figure is a view in perspective with parts broken away showing the construction of the package with which the present invention is concerned.

Referring more particularly to the drawing, the package is shown as comprising a relatively rigid inner container 10 and an outer envelope 11. The inner container is preferably in the form of a flap-sealed cardboard carton having flat side walls 12 and 13 and beveled corner walls 14, for a purpose to be hereinafter described. The top and bottom ends of the carton are provided with end portions 15 preferably having side sealing flaps 16 and 17. Disposed over the carton 10 is the sealing envelope 11. This is made of a thin sheet of material which is impervious to moisture and air, and in practice it has been found most desirable to utilize a commercial product known as "pliofilm". This product is a rubber composition which is wrapped around the carton 10 and folded over the ends thereof. It will be recognized that if the sheet material was folded over square 90° corners of a carton there would be a tendency for the square corner to break through the envelope 11 and cause it to leak. It has been for that reason that the corners of the carton have been beveled as indicated at 14. When the sheet is made of rubber composition it is possible to vulcanize the seams by applying a heated element to the exterior surface of the seam portions and by which action the envelope 11 will be hermetically sealed to embrace the carton 10. Attention is directed to the fact that due to this vulcanizing action it is not necessary to use any adhesive material which would tend to cause the envelope 11 to adhere to the outer surface of the carton 10. Thus an intermediate space 18 will occur within the envelope and all around the carton. This space is evacuated as the carton is sealed. The vacuum action is controlled so that it will not be violent and will be a relatively low degree of vacuum as compared to the heavy negative pressure to which the ordinary vacuum sealed coffee container is subjected. In fact the vacuum action in the present case is only sufficient to insure that the air has been evacuated from the space 18, thus collapsing the envelope 11 against the sides of the carton 10 and causing the sealed package to have a relatively smooth glazed surface.

Preferably the containers are designed to receive a relatively small quantity of food product, such for example as coffee. This quantity may be enough merely for one making of coffee, but may be in larger fractions of a pound so that a number of small packages may be contained in one carton, as disclosed in my co-pending application entitled Method and means of packing food products and the like, filed May 24, 1937, Serial No. 144,409. The inner containers as previously stated are preferably octagonal in shape so that there will not be any sharp 90° corners over which the envelope film 11 is drawn, thus reducing the hazard of cutting or breaking the film over these sharp edges. The inner container is then filled with freshly roasted coffee which will tend to liberate its occluded gases. It is preferable that the quantity of coffee used is not sufficient to fill the container but to leave a gas space above the coffee. The envelope film 11 is then applied to the inner container and the entire package is then subjected to a slight vacuum action. It is not desired to produce a violent vacuum action since it is contemplated that the action shall only be sufficient to evacuate the air from the space 15 which occurs between the inner carton 10 and the outer envelope film 11. Since the coffee continues to liberate gas as it ages the gas may expand beyond the confines of the carton. The provision of the outer sealed envelope makes it possible for the expanding gases which may leak through the inner container to fill the void represented by the space 18. If the inner container and the film envelope had been substantially evacuated as is now common practice, the preservative effect of the coffee would have become stale more rapidly than will be the case under the present method.

When the vacuum has been applied the film envelope 11 is then sealed by any suitable means, such for example as by the use of a thin heated plate which when moved along the seam to be sealed will supply sufficient heat to vulcanize the rubber and form a complete hermetic seal. This is performed while the package is under vacuum and thus insures that the partial condition of vacuum will be maintained within the envelope. When the envelope is sealed it will collapse against the relatively rigid wall of the inner container and will thereby indicate that the seal is a perfect one and it will then be assured that as the occluded carbon dioxide gases are naturally liberated from the coffee and seep through the container 10 they will fill the void 18 and retain the freshness of the coffee. The collapsed envelope will hold the inner container closed. The relatively small packages of coffee are then packed in a larger container. This may or may not be hermetically sealed. The main container therefor need not be an expensive tin can or sealed carton, but may be a container which may be easily opened without the use of a can opener or the like, and from which the individual packages may be removed and separately used. This insures complete freshness for each package opened and eliminates any possibility of any metallic taste in the product.

Particular attention is directed to the gaseous characteristic of the coffee when it has been placed within the container herein described. The occluded gas in the coffee is carbon dioxide gas which is heavier than air. This gas is being emanated constantly from the coffee and is present in the package in an occluded state and in a free state. The free gas tends to fill the space provided in the top of the inner container above the coffee. On the outside of the inner container and within the envelope there will be entrapped extraneous air together with a slight seepage of carbon dioxide gas from the inner container. The air is lighter than the carbon dioxide gas and when a relatively small degree of vacuum is imposed upon the envelope before sealing, such for example as of the order of nine inches of mercury, the relatively light air and a proportion of the free carbon dioxide which is heavier than air, will be extracted from the space in the envelope surrounding the inner container, and from the space in the top of the inner container without disturbing the carbon dioxide gas which is intimately associated with the coffee in the package. Attention should also be drawn to the fact that air is not present in the coffee when it is initially placed within the container for the coffee is permeated with and surrounded by the heavy carbon dioxide gas which emanates from the coffee and excludes the air. It will therefore be evident that the process here disclosed insures that the air will be evacuated from the package while retaining the maximum volume of carbon dioxide.

It will thus be seen that coffee which is packed as here disclosed has not been subjected to a high degree of vacuum to withdraw the desirable occluded gases from the coffee particles, but that only the extraneous air has been withdrawn from within the sealed envelope and within which envelope the excess liberated gases may pass from the coffee. Thus when the package of coffee is opened there will not be any inrush of air to fill the voids in the coffee particles, since these voids are occupied with the native gases which are present and which have not been extracted. This has the two-fold purpose of retaining the gases in the coffee to insure coffee freshness and of excluding air which is lighter than carbon dioxide and which if present within the coffee particles would act to oxidize the fats and produce a stale and rancid coffee. The coffee obtained from the package here described will have a maximum freshness and will be in a condition which will insure a minimum oxidation.

While I have shown the preferred form of package and have indicated the preferred steps of method of sealing a food product within the same, it will be understood that various changes might be made in the construction of the container, or in the steps of the procedure here outlined, by those skilled in the art, without departing from the spirit of the invention as claimed.

Having thus described my invention, what I claim and desire to secure by Letters Patent is:

1. A method of packing coffee which comprises placing the coffee within an inner container from which gases from the coffee may leak, thereafter enclosing the container within a flexible envelope impervious to air and moisture, then evacuating the air from the envelope to cause it to collapse against the side wall of the inner container, after which the envelope is sealed to entrap the gases emanating from the coffee whereby they may occupy the space occurring between the container and the envelope to provide a preservative medium for the coffee.

2. A method of packing coffee which consists in filling an inner container with hot roasted coffee, said container not being impervious to gas, enclosing said container in an outer flexible envelope, the walls of which are impervious to gas and moisture and evacuating the air from the envelope, thereby collapsing the envelope against the inner container, and sealing the envelope so that the gases emanating from the coffee as it cools will occupy the void between the inner container and its envelope to provide a preservative medium for the coffee.

3. A package of coffee comprising a non-metallic inner container forming a carton for the coffee, the walls of which container are not hermetically tight, and a flexible envelope for said container, the walls of which envelope are impervious to air and moisture, said envelope being collapsed against the container under vacuum and then sealed whereby air will be excluded from the package and the preservative gases which emanate from the food product may occupy the void occurring between the container and the envelope.

4. A package of coffee comprising a non-metallic container which is not impervious to gases and within which coffee is placed and which forms a carton for the coffee, a separate flexible envelope for said container, the walls of which envelope are impervious to air and moisture and the space between the envelope and the container having the air evacuated therefrom and the envelope being collapsed against the carton and sealed, whereby the occluded gases of the coffee may seep from the inner container and provide an enveloping film of coffee gases within the envelope to preserve the aroma and freshness of the coffee.

5. A package of coffee comprising a non-metallic container forming a carton for the coffee, which container is not impervious to gases and within which coffee is placed, a separate flexible envelope for said container, the walls of which envelope are impervious to air and moisture and the space between the envelope and the container having the air evacuated therefrom and the envelope being collapsed against the container and sealed whereby the occluded gases of the coffee may seep from the inner container and provide an enveloping film of coffee gases within the envelope to preserve the aroma and freshness of the coffee, said inner container being formed with a rigid wall structure whereby the shape of the package may be preserved regardless of the evacuation of the outer envelope.

6. A package of coffee comprising an inner cardboard container relatively flat and of octagonal shape and from which gases from the coffee may seep, an outer flexible envelope therefor formed of a sheet rubber composition and collapsed under a vacuum against the inner container, the seams of which envelope are vulcanized to hermetically seal the package, whereby gases emanating from the coffee may fill the void between the envelope and the container and surround the carton and coffee with a preservative film of gases.

7. A method of packing freshly roasted coffee which consists in placing the coffee within a pervious container consisting of a carton from which coffee gases may seep, thereafter enclosing the pervious container within an impervious flexible collapsible container, subjecting the impervious container to a vacuum action sufficient only to withdraw the air from the impervious container and to cause the impervious container to collapse against the pervious container and sealing the outer impervious container whereby coffee gases will occupy the void between the inner and outer containers and form a film of preservative gases around the carton.

8. A method of packing freshly roasted coffee which consists in placing coffee within a pervious container forming a carton for the coffee and having substantially rigid walls, thereafter enclosing said pervious container within a flexible impervious collapsible container, subjecting the impervious container to a suction action of the order of nine inches of mercury and thereby collapsing the outer container against the carton, and sealing the outer container whereby gases emanating from the freshly roasted coffee will be caused to occupy the space between the inner and outer containers and form a film of preservative gases exteriorly of the carton.

9. A method of packing freshly roasted coffee which consists in partially filling a pervious container with coffee, the walls of said container being substantially rigid and forming a carton, thereafter placing said container within an envelope formed of sheet rubber, evacuating the air from the envelope and causing the same to collapse against the carton, and then vulcanizing the seams of the envelope to hermetically seal the container while under a vacuum sufficient only to withdraw the air from the envelope, whereby gases emanating from the coffee will fill the void between the carton and the envelope and form a film of preservative gases around the carton.

10. A method of packing freshly roasted coffee which consists in partially filling a container with coffee, the said container being pervious and permitting seepage of coffee gases from it, thereafter enclosing the container within a collapsible envelope of impervious flexible material, then subjecting the envelope to a vacuum action sufficient only to extract the free air and free gases from the package and collapse the envelope against the inner container, after which the outer envelope is hermetically sealed, whereby gases emanating from the coffee will fill the void between the carton and the envelope and form a film of preservative gases around the carton.

11. A method of packing food products evolving gas, which consists in placing the product within an inner container not impervious to gas, enclosing said inner container in an outer flexible envelope, the walls of which are impervious to air and moisture and vacuumizing the air from the envelope, thereby collapsing the envelope against the inner container, and sealing the envelope so that gases emanating from the product will occupy the void between the inner container and the outer envelope to provide a preservative medium for the product.

SAMUEL H. BERCH.